United States Patent [19]

Akiyama

[11] 4,344,165

[45] Aug. 10, 1982

[54] METHOD AND SYSTEM FOR A DISC PLAYER TRACKING SERVO

[75] Inventor: Toru Akiyama, Tokorozawa, Japan

[73] Assignee: Universal Pioneer Corporation, Tokyo, Japan

[21] Appl. No.: 205,969

[22] Filed: Nov. 12, 1980

[30] Foreign Application Priority Data

Nov. 17, 1979 [JP] Japan .............................. 54-159704[U]

[51] Int. Cl.³ .......................... G11B 7/00; G11B 21/10
[52] U.S. Cl. ........................................ 369/44; 250/202; 360/77; 358/128.5; 369/111; 369/124; 369/174
[58] Field of Search .................... 369/44, 46, 124, 133, 369/111, 174, 43; 250/201, 202; 360/77, 65, 67, 27; 358/128.5, 127

[56] References Cited

U.S. PATENT DOCUMENTS

| 3,906,152 | 9/1975 | Hoogendyik | 358/128.5 |
| 4,037,252 | 7/1977 | Janssen | 369/46 |
| 4,142,210 | 2/1979 | Otobe | 369/111 |
| 4,157,568 | 6/1979 | Ohki | 369/111 |
| 4,165,495 | 8/1979 | Takahashi | 369/111 |

*Primary Examiner*—Alan Faber
*Attorney, Agent, or Firm*—Michael J. Striker

[57] ABSTRACT

In a tracking servo system of a recording-disc information reading and reproducing apparatus such as a video disc player, a tracking error signal indicative of an amount of deviation of an information pickup medium such as a focused spot of a scanning beam of light from a target track of the recording disc being scanned is amplified with a gain which is varied as the pickup medium is displaced radially of the recording disc between an outer peripheral area and a central area of the disc.

6 Claims, 6 Drawing Figures

METHOD AND SYSTEM FOR A DISC PLAYER TRACKING SERVO

FIELD OF THE INVENTION

The present invention relates in general to a method of and an apparatus for reading and reproducing the information carried on a recording disc such as, for example, a video or digital audio disc to be optically, electrostatically or otherwise scanned. Particularly, the present invention is concerned with a tracking servo system for use in a recording-disc information reading and reproducing apparatus to use such a recording disc and also with a method of reducing the deviation of a pickup medium or a detecting spot such as a scanning spot of a laser beam from a target track of the recording disc to be scanned by the pickup medium.

BACKGROUND OF THE INVENTION

In a recording-disc information reading and reproducing apparatus of, for example, the optically or electrostatically scanning type, multiplex signals consisting of frequency modulated video and/or audio carriers superposed on each other are stored in the form of a series of depressed areas or "pits" formed in each or one information-carrying face of a video or audio disc. These depressed areas or pits are arranged in a spital track or in a number of concentric tracks about the center axis of the disc. The video and/or audio information thus stored in the recording disc is read out by optically, electrostatically or otherwise scanning the individual pits along the spiral track or each of the concentric tracks. In the case of an optically scanning video or audio information reading and reproducing apparatus, for example, the video and/or audio information stored on a video or audio recording disc is read out by scanning the pits by means of a beam of laser light and thereby detecting the lengths of and spacings between the scanned pits. During playback of such a recording disc or during selection of desired pieces of information out of the information carried on the information-carrying face of the disc to be played back, the disc is driven for rotation about the center axis thereof and the beam of the laser light is displaced radially of the information-carrying face of the rotating disc. The laser beam thus directed onto a target track on the information-carrying face of the disc is reflected from the face or passed through the disc and the information picked up by the laser beam from the information-carrying face of the disc is converted into electric signals. These electric signals are further converted upon frequency demodulation into video and/or audio signals to be reproduced.

The laser beam to read out the information recorded on an information-carrying face of a video or audio disc is transmitted from a laser emitter to a tracking mirror through a lens system and is reflected from the tracking mirror toward the information-carrying face of the disc to be played back or scanned by the beam. The tracking mirror is turnably mounted on a slider movable back and forth in a radial direction of the disc to be played back or scanned and is urged to stay in a predetermined neutral or home angular position about the axis of rotation thereof on the slider. During scanning of the video or audio disc to be played back, the slider is driven to travel in such a direction with respect to the disc and, concurrently, the tracking mirror is driven to turn between two opposite limit angular positions from the neutral or home angular position thereof about the axis of rotation of the mirror on the slider. These motions of the slider and the tracking mirror are effected under the control of a tracking servo system.

A conventional tracking servo system for use in a recording-disc information reading and reproducing apparatus has, in its control servo loop, error signal producing means adapted to produce a tracking error signal which is continuously variable in magnitude with an amount of deviation, if any, of the scanning spot of the laser beam or any other form of pickup medium or a detecting spot from a target track on the disc to be scanned.

It is, in this instance, known to those skilled in the art that the amplitude of such a tracking error signal has a tendency to vary depending upon the locations of the pickup medium with respect to the center axis of the recording disc being scanned. That is, the amplitude of the tracking error signal tends to decrease as the radial displacement of the pickup medium from the center axis increases. If the tracking error signal thus variable with the distance in radial direction between the axis of rotation of the rotating disc and the pickup medium scanning the disc is used directly as the signal to control the tracking servo system, there would result deterioration in the performance reliability of the tracking servo system per se. The present invention contemplates elimination of such a drawback inherent in a prior-art tracking servo system of a recording-disc information reading and reproducing apparatus.

It is, accordingly, an important object of the present invention to provide an improved tracking servo system which will enable the pickup medium or detecting spot of a recording-disc information reading and reproducing apparatus to accurately scan a recording disc throughout the radial displacement of the pickup medium or detecting spot with respect to the recording disc during scanning of the disc.

SUMMARY OF THE INVENTION

In accordance with one outstanding aspect of the present invention, there is provided a method of reducing the deviation of an information detecting spot of a pickup device with respect to a target track of a rotating recording disc from which information at the detecting spot on the target track is read by means of the pickup device in a recording-disc information reading and reproducing apparatus, comprising the steps of: detecting an amount of deviation of the detecting spot from the target track; producing a tracking error signal which is continuously variable in magnitude with the detected amount of deviation; amplifying the tracking error signal with a variable gain; controlling, by the amplified tracking error signal, the position of the detecting spot with respect to the target track so as to reduce the amount of deviation; detecting the radial position of the pickup device with respect to the axis of rotation of the recording disc; producing a detecting signal representative of the detected radial position of the pickup device; producing a gain control signal variable with the detecting signal; varying the gain in accordance with the gain control signal so that the gain is larger when the pickup device takes an outer radial position of the recording disc than when the pickup device takes an inner radial position.

The detection signal may consist of at least one pulse indicative of a predetermined intermediate position of the pickup device between predetermined innermost and outermost radial positions of the pickup device with respect to the recording disc rotating about the above mentioned center axis thereof. In this instance, the gain control signal is stepwise variable and as a consequence the gain with which the error signal is to be amplified is also stepwise variable in response to the detection signal.

As an alternative, the detection signal may be such that is continuously variable in magnitude in response to the displacement of the pickup device between predetermined innermost and outermost radial positions thereof with respect to the recording disc rotating about the center axis thereof.

In accordance with another outstanding aspect of the present invention, there is provided a tracking servo system for a recording-disc information reading and reproducing apparatus wherein the information carried by a recording disc rotated about the center axis thereof is scanned by a detecting spot of a pickup device displaced radially of the disc, comprising: tracking error signal producing means operative to detect an amount of deviation of the detecting spot from a target track on the recording disc and to produce a tracking error signal continuously variable with the detected amount of deviation; gain-variable amplifier means having a control terminal and operative to amplify the tracking error signal with a gain variable with a signal appearing at the control terminal of the amplifier means; position detecting means operative to detect the amount of radial position of the pickup device with respect to the axis of rotation of the recording disc and to produce an output signal which is variable with the detected amount of radial position of the pickup device; and gain-control signal generating means responsive to the output signal from the position detecting means and operative to produce a gain control signal variable with the output signal from the position detecting means, said gain-control signal generating means having an output terminal connected to the control terminal of the variable-gain amplifier means so that the gain effective in the amplifier means is larger when the pickup device takes an outer radial position of the recording disc than when the pickup device takes an inner position.

The present invention will be hereinafter described in connection with a recording-disc information reading and reproducing apparatus of the type which uses a focussed spot of a laser light beam as the above mentioned pickup medium or detecting spot of the pickup device. It should however be borne in mind that this is merely for the purpose of illustration and accordingly that the subject matter of the present invention is applicable to any other types of recording-disc information reading and reproducing apparatus of, for example, the static capacitance type which per se is also well known in the art.

BRIEF DESCRIPTION OF THE DRAWING

The features and advantages of a method and a tracking servo system according to the present invention will be more clearly understood from the following description taken in conjunction with the accompanying drawing, in which.

DESCRIPTION OF THE PREFERRED EMBODIMENT

Figure 1:
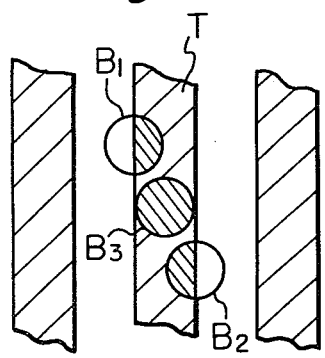
FIG. 1 is a view schematically showing a basic concept on the basis of which the location of the scanning spot with respect to a target track on an optically scanned video disc is to be detected by the use of index beams of laser light for producing a tracking error signal for use in a tracking servo system proposed by the present invention.

In order to produce signals to control the tracking servo system of a recording-disc information reading and reproducing apparatus of, for example, the optically scanned type, two index beams of laser light are radiated onto an information-carrying face of a video disc which is to be scanned by a scanning laser beam. The three beams of laser light are focused at points located in predetermined relationship to each other on the information-carrying face of the video disc being scanned. FIG. 1 shows an example of such a relationship among the respective focused spots of these three beams, wherein the focused spots of the index beams are denoted by $B_1$ and $B_2$ and the focused spot of the scanning beam is denoted by $B_3$. In the example herein shown, the three beams are assumed to be directed toward a target track T so that one of the focused spots $B_1$ and $B_2$ of the index beams overlaps the target track T over one half area of the spot and the other focused spot overlaps the target track T over the other half area of the spot when the focused spot $B_3$ of the scanning beam is correctly located on the target track T. When the focused spots $B_1$, $B_2$ and $B_3$ of the index and scanning beams are thus located with respect to the target track T, the signal level of the reproduce signal resulting from the light beam reflected from or passed through the focused spot $B_3$ of the scanning beam peaks up. If, furthermore, a tracking error signal (Se) is produced through detection of the difference between the levels of the signals respectively produced from the light beams reflected from or passed through the focused spots $B_1$ and $B_2$ of the index beams, the error signal assumes a zero value when the focused spots $B_1$ and $B_2$ are located as illustrated in FIG. 1 since the levels of such signals are substantially equalized under such a condition.

Figure 2:
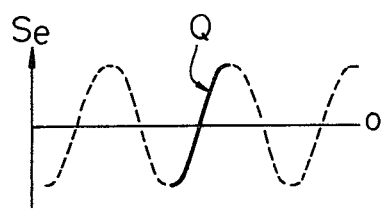
FIG. 2 is a graph showing an example of the waveform of the tracking error signal produced on the basis of the concept schematically illustrated in FIG. 1.

If the scanning beam is then displaced radially of the information-carrying face of the video disc in one direction perpendicular to the target track T, the level of the tracking error signal Se will vary sinusoidally as indicated by curve Q in FIG. 2 or, particularly with respect to the track T, by a full line segment of the curve Q, as the scanning beam is moved from one of the parallel tracks or track portions to another. The level of the sinusoidal wave Q varies in proportion to the distance between the center point of the focused spot $B_3$ of the scanning beam and the center line of the target track closest to the focused spot $B_3$. On the other hand, the polarities of the signal indicated by the sinusoidal wave Q corresponds to the directions in which the focused spot $B_3$ of the scanning beam is moving toward and away from the target track.

Whereas, it has been empirically known to those familiar with the art that the amplitude of the tracking error signal Se produced in the above described fashion varies depending upon the locations of the focussed spot $B_3$ of the scanning beam with respect to the center axis of the video disc being scanned, viz., with the distance in radial direction between the focussed spot $B_3$ of the scanning beam and the axis of rotation of the rotating disc. This may be accounted for by the gradual or stepwise variation in the radius of curvature of the track or tracks in the disc. If the pickup arm carrying the laser beam emitter cartridge, that is, the pick up device is of the offset type having the cartridge directed at a certain angle to the line passing through the cartridge and the fulcrum point of the pickup arm, the variation in the amplitude of the tracking error signal Se may result from the fact that the laser emitter cartridge is moved in a direction angled with respect to a radial direction of the disc.

Thus, the tracking error signal Se produced from the focussed spots $B_1$ and $B_2$ of the index beams incident on an information-carrying face of a video disc tends to increase in amplitude as the focussed spot $B_2$ of the scanning beam advances toward the outer peripheral end of the disc and to decrease as the focussed spot $B_3$ is displaced toward the central area of the disc. Such variation in the amplitude of the error signal Se usually occurs linearly between the central area and the outer peripheral end of the information-carrying face of a disc.

If the tracking error signal Se which is thus subject to such linear variation is used as it is for the control of the tracking servo system, the accuracy of control would vary as the focussed spot $B_3$ of the scanning beam is displaced radially inwardly or radially outwardly of the disc being scanned by the beam and would spoil the performance reliability of the tracking servo system per se.

The present invention aims at resolution of this problem which has been encountered by conventional tracking servo systems of recording-disc information reproducing apparatus.

Figure 3:
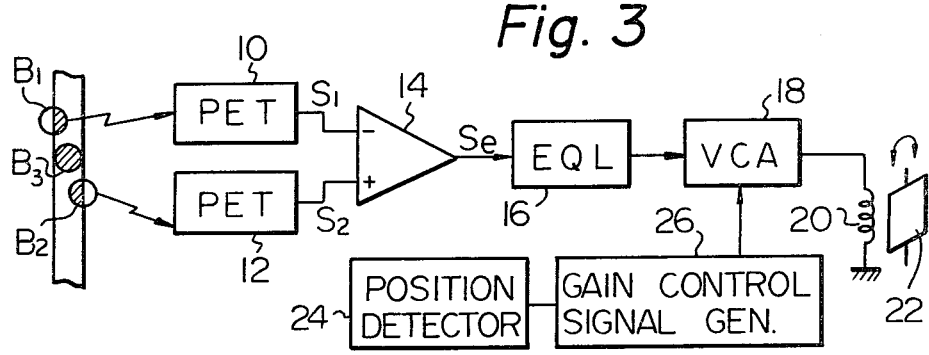
FIG. 3 is a block diagram showing a preferred embodiment of the tracking servo system according to the present invention.

Referring to FIG. 3 of the drawing, the servo loop of such an improved servo system is shown comprising first and second photoelectric transducer units 10 and 12 which are main elements of the pickup device and are adapted to convert luminous information into a corresponding electric signal. The first and second transducer units 10 and 12 are responsive to the beams of light reflected from or passed through the focussed spots $B_1$ and $B_2$, respectively, of the index laser beams and are operative to produce output signals $S_1$ and $S_2$, respectively. The signals $S_1$ and $S_2$ have signal levels respectively proportional to the areas over which the focused spot $B_1$ and $B_2$ of the index laser beams overlap the target track T on the video disc being played back, as will be understood from the description previously made with reference to FIG. 1. On the other hand, the scanning laser beam reflected from or passed through the focussed spot $B_3$ is detected by a third photoelectric transducer unit (not shown) and is converted into an output signal containing the video and audio information to be reproduced. Such a third photoelectric transducer unit and the associated circuit components are rather immaterial to the understanding of the subject matter of the present invention and, for this reason, description regarding the arrangement including such a transducer unit and circuit components will not be herein incorporated.

The output signals $S_1$ and $S_2$ delivered from the first and second photoelectric transducer units 10 and 12 are fed to subtractor means which is shown constituted by a differential amplifier 14 having two input terminals connected to the respective output terminals of the transducer units 10 and 12. The differential amplifier 14 is adapted to process the signals $S_1$ and $S_2$ as, for example, the subtrahend and minuend, respectively, and thereby produce an output signal indicative of the difference between the levels of the signals $S_1$ and $S_2$. The output signal produced by the differential amplifier 14 is, thus, the above mentioned tracking error signal Se and varies sinusoidally as shown in FIG. 2 as the scanning beam is displaced radially of the information-carrying face of the video disc.

The differential amplifier 14 has an output terminal connected through an equalizer circuit 16 (EQL) to an input terminal of a voltage-controlled variable-gain amplifier (VCA) 18. The variable-gain amplifier 18 has an output terminal connected to ground through a driver coil 20 for a tracking mirror 22. The tracking mirror 22 forms part of a laser beam emitter unit of the pickup device carried on a pickup arm (not shown) and is arranged to be rotatable about an axis fixed with respect to the pickup arm. During scanning operation for a video disc, the tracking mirror 22 is driven to turn about such an axis through an angle variable with the level of the signal fed to the coil 20 and in a direction dictated by the polarity of the signal passed through the coil 20, as is well known in the art. The voltage-controlled variable-gain amplifier 18 has a control terminal and is adapted to amplify the output signal from the equalizer circuit 16 with a gain which is variable with the voltage appearing at the control terminal thereof.

The voltage to appear on the control terminal of the voltage-controlled variable-gain amplifier 20 is supplied from a control circuit comprising position detecting means constituted by way of example by a spot-position detector 24 and gain control signal generating means constituted by way of example by a gain-control signal generator 26. The spot-position detector 24 provided in the embodiment herein shown is adapted to detect the location or locations, in radial direction of the disc, of the focussed spot $B_3$ (FIG. 1) of the scanning beam being displaced in radial direction of the disc and to produce a signal or signals indicative of the detected location or locations of the spot $B_3$. The output signal or each of the output signals thus produced by the spot-position detector 24 is supplied to the gain-control signal generator 26. The gain-control signal generator 26 is responsive to the output signal or signals from the spot-position detector 24 and is operative to produce a gain control signal in response to the input signal or each of the input signals impressed thereon. The gain control signal or each of the gain control signals thus produced by the signal generator 26 is fed to the control terminal of the above described variable-gain amplifier 18 for enabling the amplifier 18 to amplify the output signal from the equalizer circuit 16 with a gain which is variable with the control signal or each of the control signals supplied from the gain-control signal generator 26.

The focussed spot $B_3$ (FIG. 1) of the scanning beam which is herein under consideration is simply an example of those pickup media or detecting spots which are operable for scanning information-carrying faces of recording discs in general. Thus, the spot-position detector 24 having the functions above described may be substituted by any suitable alternative insofar as the position detecting means comprising such an alternative is operable for detecting at least one predetermined intermediate position between predetermined innermost and outermost radial positions of the pickup means, that is, pickup device to be displaced in radial direction of the disc to be scanned.

Figure 4A:
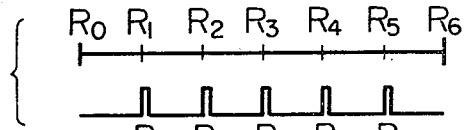
FIG. 4A shows charts indicating an example of the principle of control which may be adopted in the tracking servo system illustrated in FIG. 3.

In the embodiment herein shown, the spot-position detector 24 constituting such position detecting means is assumed, by way of example, to be operative to detect a total of five predetermined intermediate positions $R_1$, $R_2$, ... $R_5$ between a predetermined innermost radial position $R_o$ and a predetermined outermost radial position $R_6$ of the focussed spot $B_3$ of the scanning beam to be displaced radially of the information-carrying face of the disc. When the focussed spot $B_3$ of the scanning beam directed from the tracking mirror 22 toward the information-carrying face of the video disc to be scanned is displaced under so-called coarse control from, for example, the innermost radial position $R_o$ toward the outermost radial position $R_6$ with respect to the information-carrying face of the disc, the spot-position detector 24 produces pulse signals $P_1$, $P_2$, ... $P_5$ as the focussed spot $B_3$ is moved past these intermediate positions $R_1$, $R_2$, ... $R_5$, respectively, as indicated in the charts of FIG. 4A.

In response to these pulse signals $R_1$, $R_2$, ... $R_5$ thus supplied from the spot-position detector 24, the gain-control signal generator 26 produces a series of gain control signals which stepwise vary in magnitude, such as in voltage. These gain control signals are fed in succession to the control terminal of the voltage-controlled variable-gain amplifier 18 and enable the amplifier 18 to amplify the input signal thereof with a gain which is stepwise varied in response to the gain control signals supplied from the gain-control signal generator 26. In this instance, the variable-gain amplifier 18 and the gain-control signal generator 26 are arranged so that the gain effective in the amplifier 18 increases stepwise in response to the gain control signals resulting respectively from the pulse signals $P_1$, $P_2$, ... $P_5$ delivered from the spot-position detector 24, viz., as the focussed spot $B_3$ of the scanning beam (FIG. 1) is displaced from the innermost radial position $R_o$ toward the outermost radial position $R_6$ with respect to the video disc being scanned.

Figure 4B:
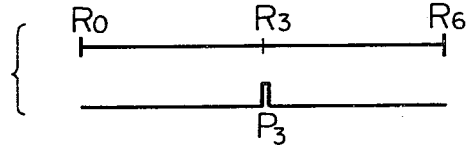
FIG. 4B is similar to FIG. 4B but shows charts indicating another example of the principle of control which can be made use of in the tracking servo system illustrated in FIG. 3.

While it has been assumed that the gain effective in the variable-gain amplifier 18 provided in the embodiment shown in FIG. 3 is varied in five steps during displacement of the pickup medium between the innermost and outermost radial positions $R_o$ and $R_6$ with respect to the disc to be scanned, such variation may be effected in a smaller or larger number of steps if desired. FIG. 4B shows a scheme in which the position detecting means forming part of the tracking servo system according to the present invention is operative to detect only one predetermined intermediate position $R_3$ between the above mentioned innermost and outermost radial positions $R_o$ and $R_6$ with respect to the video disc to be scanned. In this instance, the spot-position detector 24 is operative to produce only a pulse signal $P_3$ in response to such an intermediate position $R_r$ during displacement of the scanning beam between the predetermined two extreme radial positions $R_o$ and $R_6$ with respect to the disc to be scanned.

The spot-position detector 24 operative to produce the pulse signals $P_1$, $P_2$, ... $P_5$ as indicated in FIG. 4A may be constituted by suitable mechanically-actuated electric switch elements such as, for example, micro switches (not shown) which are arranged in predetermined positions to correspond respectively to certain locations, in radial direction, of a video disc or, generally, a recording disc so as to be mechanically engaged one after another by the pickup arm carrying the pickup device and being driven to move from, for example, its position close to the central area of the disc in use toward its position close to the outer circumference of the disc. Likewise, the spot-position detector 24 adapted to produce the sole pulse signal $P_3$ as indicated in FIG. 4B may be constituted by a suitable mechanically-actuated electric switch such as a micro switch (not shown) which is arranged in a predetermined position to correspond to a certain radial location of a video or other recording disc so as to be mechanically engaged by the pickup arm which is on its way between the positions respectively close to the central area and the outer circumference of the disc. As an alternative, the position detecting means provided in the tracking servo system according to the present invention may be constructed and arranged to be optically responsive to a predetermined intermediate position or a plurality of predetermined positions of the pickup medium with respect to the disc to be scanned.

Figure 4C:
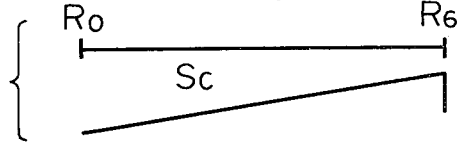
FIG. 4C shows charts indicating still another example of the principle of control which can be adopted in the tracking servo system according to the present invention.

While is has been assumed that the gain effective in the voltage-controlled variable-gain amplifier 18 is stepwise varied as the pickup medium is displaced between the central area and the outer peripheral end of the disc to be scanned, it will be apparent that the control circuit for the variable-gain amplifier 18 may be arranged to be capable of continuously vary the gain effective in the amplifier 18 as the pickup medium is radially displaced between the central area and the circumference of the disc to be scanned. For this purpose, the position detecting means of the tracking system according to the present invention may be constructed and arranged to be operative to produce an output signal Sc which continuously or linearly vary as the focussed spot $B_3$ (FIG. 1) of the scanning spot is displaced radially of the disc between, for example, the previously mentioned predetermined innermost and outermost radial positions $R_o$ and $R_6$ with respect to the disc, as indicated in FIG. 4C. The position detecting means of this nature may be constituted by, for example, a potentiometer (not shown) having a sliding contact which is arranged to be movable with the pickup arm carrying the tracking mirror 22 for producing a voltage continuously variable with the movement of the pickup arm with respect to the disc to be scanned.

What is claimed is:

1. A method of reducing the deviation of an information detecting spot of a pickup device with respect to a target track of a rotating recording disc from which information recorded at the detecting spot on said target track is read by means of said pickup device in a recording-disc information reading and reproducing apparatus, comprising the steps of:

detecting an amount of deviation of the detecting spot from said target track;

producing a tracking error signal which is continuously variable in magnitude with the detected amount of deviation;

amplifying the tracking error signal with a variable gain;

controlling, by the amplified tracking error signal, the position of the detecting spot with respect to said target track so as to reduce said amount of deviation;

detecting the radial position of said pickup device with respect to the axis of rotation of the recording disc;

producing a detecting signal representative of the detected radial position of the pickup device;

producing a gain control signal variable with the detecting signal; and varying said gain in accordance with the gain control signal so that said gain is larger when the pickup device takes an outer radial position of the recording disc than when the pickup device takes an inner position.

2. A method as set forth in claim 1, in which said detection signal consists of at least one pulse indicative of a predetermined intermediate position of said detecting spot between predetermined innermost and outermost radial positions of the pickup device with respect to the recording disc rotating about said axis thereof, said gain control signal and said gain being stepwise variable in magnitude in response to said detection signal.

3. A method as set forth in claim 1, in which said detection signal is continuously variable in magnitude in response to the displacement of said pickup device between predetermined inner and outer radial positions thereof with respect to the recording disc rotating about said axis thereof.

4. A tracking servo system for a recording-disc information reading and reproducing apparatus wherein the information carried by a recording disc rotated about the center axis thereof is scanned by a detecting spot of a pickup device displaced radially of the disc, comprising:

tracking error signal producing means operative to detect an amount of deviation of the detecting spot from a target track on the recording disc and to produce a tracking error signal continuously variable with the detected amount of deviation;

variable-gain amplifier means having a control terminal and operative to amplify the tracking error signal with a gain variable with a signal appearing at the control terminal of the amplifier means;

position detecting means operative to detect the amount of radial position of the pickup device with respect to the axis of rotation of the recording disc and to produce an output signal which is variable with the detected amount of the radial position of the pickup device; and gain-control signal generating means responsive to the output signal from the position detecting means and operative to produce a gain control signal variable with the output signal from the position detecting means, said gain-control signal generating means having an output terminal connected to said control terminal of the variable-gain amplifier means so that the gain effective in the amplifier means is larger when the pickup device takes an outer radial position of the recording disc than when the pickup device takes an inner radial position.

5. A tracking servo system as set forth in claim 4, in which said position detecting means is operative to produce as said detection signal at least one pulse signal which is indicative of a predetermined intermediate position of the pickup device between predetermined innermost and outermost radial positions of the pickup device with the recording disc rotating about said axis thereof, said gain-control signal generating means and said variable-gain amplifier means being operative so that said gain control signal and said gain being stepwise variable in magnitude in response to said pulse signal.

6. A tracking servo system as set forth in claim 4, in which said position detecting means is operative to produce as said detection signal a continuous signal which is continuously variable in magnitude in response to the displacement of said pickup device between predetermined inner and outer radial positions thereof with respect to the recording disc rotating about said axis thereof.

* * * * *